(12) United States Patent
Truss

(10) Patent No.: US 7,676,991 B2
(45) Date of Patent: Mar. 16, 2010

(54) FIRE COLLAR

(75) Inventor: James Walter George Truss, Thornside (AU)

(73) Assignee: IG6 PTY LTD, Hendra, Queensland ( * ) Notice: Subject to any disclaimer, the term of this patent is extended or adjusted under 35 U.S.C. 154(b) by 293 days.

(21) Appl. No.: 10/545,338

(22) PCT Filed: Feb. 10, 2004

(86) PCT No.: PCT/AU2004/000143

§ 371 (c)(1), (2), (4) Date: Aug. 11, 2005

(87) PCT Pub. No.: WO2004/072530

PCT Pub. Date: Aug. 26, 2004

(65) Prior Publication Data

US 2006/0191216 A1   Aug. 31, 2006

(30) Foreign Application Priority Data

Feb. 11, 2003   (AU) ............................... 2003900592

(51) Int. Cl.
*E04H 9/00* (2006.01)
*E04C 2/52* (2006.01)
*E04C 2/00* (2006.01)
*F16K 17/40* (2006.01)

(52) U.S. Cl. ............................. 52/1; 52/232; 52/220.8; 137/75

(58) Field of Classification Search ...................... 52/1, 52/232, 220.8, 317; 137/75–77
See application file for complete search history.

(56) References Cited

U.S. PATENT DOCUMENTS

| | | | | |
|---|---|---|---|---|
| 3,462,890 A | * | 8/1969 | Blumenkranz et al. | 52/1 |
| 3,678,634 A | * | 7/1972 | Wise et al. | 52/1 |
| 3,726,050 A | * | 4/1973 | Wise et al. | 52/1 |
| 4,136,707 A | * | 1/1979 | Gaillot et al. | 52/232 |
| 4,263,930 A | * | 4/1981 | McCabe | 137/80 |
| 4,559,745 A | * | 12/1985 | Wexler | 52/1 |
| 4,796,401 A | * | 1/1989 | Wexler | 52/232 |
| 5,253,455 A | * | 10/1993 | Cross | 52/1 |
| 5,275,193 A | * | 1/1994 | Wright | 137/75 |
| 5,331,946 A | * | 7/1994 | Yamini et al. | 52/317 |
| 5,421,127 A | * | 6/1995 | Stefely | 52/1 |
| 6,644,337 B2 | * | 11/2003 | Heil | 137/75 |

FOREIGN PATENT DOCUMENTS

| | | |
|---|---|---|
| DE | 29704346 U1 * | 6/1997 |
| DE | 29719936 U1 * | 12/1997 |
| WO | WO 9119127 A * | 12/1991 |

* cited by examiner

*Primary Examiner*—Richard E Chilcot, Jr.
*Assistant Examiner*—Elizabeth A Plummer
(74) *Attorney, Agent, or Firm*—Abelman, Frayne & Schwab

(57) ABSTRACT

A fire collar, for location in a concrete slab around a deformable conduit, has a housing with a passageway through which the conduit passes. The collar has the housing in which are located two compression springs with arms which are held against the force of the springs by fusible links. When the heat of a fire on one side of the slab causes the fusible links to soften or melt, the force of the springs causes the spring arms to rotate towards the conduit, engaging the conduit and collapsing it. An intumescent layer may be provided around the conduit to assist in collapsing it.

13 Claims, 4 Drawing Sheets

FIRE COLLAR

CROSS-REFERENCE TO RELATED APPLICATIONS

This application is a 371 of PCT/AU2004/000143, filed on Feb. 10, 2004.

This invention relates to a device for preventing fire from spreading from one side of a barrier, such as a wall, floor, partition or the like, in a structure, to the other side through pipework or ducting which extends through the barrier. In particular, the invention is primarily concerned with a new form of fire collar for location in concrete slabs forming the floors and walls of multi-storey buildings.

There are in general two types of devices which are used to prevent fire from spreading through pipes, conduits or ducts in walls, floors, partitions and the like, fire dampers and fire collars. Fire dampers are generally located in a barrier and are connected to pipework or ducting. They include a passage which may be closed by a valve arrangement when a fire on one side of the barrier triggers a heat detector incorporated in the damper. An example of this type of fire damper is described in WO 03/023267 A1.

Fire collars are usually employed with pipework or ducting which are formed from a deformable material including a plastics material such as PVC, rubber, or a deformable metal or composite material. A common type of fire collar comprises a metal collar which is fastened around a concrete slab-penetrating pipe formed from a plastics material, in the region where it traverses the slab. The collar encloses an intumescent material. When a fire on one side of the concrete slab reaches a sufficient intensity, it causes the intumescent material to expand, which in turn collapses or pinches off the deformable pipe. In this way, fire is prevented from spreading to the other side of the concrete slab by passing through the conduit. Examples of such fire collars are described in U.S. Pat Nos. 5,058,346 and 5,347,767. In another form of fire collar, the heat of the fire melts the pipe where it penetrates the slab, and the subsequent expansion of the intumescent material seals off the void left by the melted pipe.

A major problem with prior art fire collars is that in rapidly advancing fires the time taken for the intumescent material to seal off the pipe or the void left by a melted pipe can be too long, as a result of which the fire is still able to spread to the other side of the barrier.

One recent attempt to overcome this problem is a fire damper which comprises a tubular insert having a grid of intumescent material formed across the diameter of the pipe or duct. However, although such an arrangement facilitates very rapid sealing, it has the disadvantage that it slows down the flow of fluid along the pipe or duct. Such a reduction in flow may occur at each location in which the pipe or duct traverses concrete slabs, to the extent that effectively, a cessation of fluid flow may ultimately occur.

It is an object of the invention to provide an improved fire collar.

The invention provides a fire collar for preventing the spread of fire from one side of a barrier to the other side of said barrier, said fire collar being adapted to be located in said barrier and to surround or incorporate a deformable conduit which traverses said barrier, said fire collar being further adapted to respond to said fire by collapsing said deformable conduit, characterised in that said fire collar includes clamp means, in that said clamp means is retained in a first position by retaining means, and in that said retaining means is actuated when a predetermined temperature is reached as a result of said fire, such that said clamp means is released, thereby moving towards a second position whereby it firstly contacts said conduit and then collapses said conduit.

Throughout this specification, the term "barrier" is to be taken to mean a wall, a floor (particularly a slab floor of the type used in multi-storey buildings), a partition or the like, which are features of structures such as buildings. Throughout this specification, the term "conduit" is intended to refer to a pipe, pipework, a conduit, a duct, or the like, features of structures such as buildings.

Pipework and ducting are used to carry fluids within many structures. Fluids carried by pipework and ducting include gases, such as airconditioning air and waste gases, and liquids such as liquid wastes and water. Conduits are used to carry cabling such as electrical cables, telephones cables, computer network cables, fibre optic cables and the like. In many structures it is necessary to minimise the likelihood of fire being propagated between regions within the structure. For example, in multi-storey buildings, pipes, conduits and ducting pass through partitions such as the concrete slabs between storeys. The fire collar of the present invention is suitable for a wide variety of pipework, conduits and ducting which is used for various purposes.

The fire collar of an embodiment of the invention is intended, in use, to collapse a deformable conduit in the event that a fire occurs on one side of the barrier in which the fire collar is situated. In one form, a fire collar may be mounted over pipework or ducting where the pipework or ducting is itself deformable and the pipework or ducting thus forms the deformable conduit. Alternatively, the collar may be provided with a deformable collar extending therethrough, the deformable conduit having adapters at either end to receive, or to be received in, the pipework or ducting. The deformable conduit may be of any convenient cross-section, adapted to integrate with the pipework or ducting.

The deformable conduit may be formed from any convenient deformable material. Suitable deformable materials include plastics materials such as PVC and rubber, or a deformable metal or composite material. It will be appreciated by those skilled in the art that the term "deformable" in this context means that the conduit is elastically or plastically deformable to the extent necessary for the conduit to be substantially collapsed or pinched off. Preferably, the deformable conduit may be a PVC pipe that, at the temperatures to which the pipe may be subjected in a fire, is capable of such deformation. It will be appreciated that these material properties of the conduit are applicable at the temperature and conditions under which the conduit is required to collapse. For instance, whilst a PVC pipe may be incapable of deforming to the point of collapse at room temperature, at the particular temperature to which the pipe is subjected in the case of fire, the conduit will be able to be collapsed under pressure from the clamp means.

The fire collar of an embodiment of the present invention may be of any convenient shape and preferably has a passage therethrough for receiving a deformable conduit. Preferably, the passage through the collar will have a sufficiently large cross-section to accommodate the deformation of the conduit when it collapses.

In one embodiment of the present invention the clamp may be disposed within the collar. Alternatively, the clamp may be mounted on an external surface of the collar. Generally, as the fire collars are designed for mounting within a concrete slab, it is preferred that the clamp and associated detents are disposed within the collar for free movement in the absence of interference from the concrete slab.

The collar may be formed of any convenient material, including plastics material. The collar may be moulded. Preferably the collar will include intumescent material such that in the case of fire the intumescent material of the collar will expand and further collapse the deformable conduit to provide improved sealing of the conduit and minimise the propagation of any fire through the barrier.

The clamp means may be formed from one or more moveable arms and may include a fixed anvil against which the one or more moveable arms may bear in a normal orientation. In a preferred embodiment of the present invention, the clamp comprises a pair of opposed arms between which the deformable conduit is collapsed in response to a fire on one side of the barrier.

The clamp is normally biased to a second position, in which the clamp arms bear upon the deformable conduit and collapse it. The clamp may be biased to the second position using an elastic member such as a spring. The moveable arm or arms of the clamp may be biased by an elastic member. In one preferred form the clamp is provided by a pair of opposed arms pivotally mounted within the collar on opposite sides of the deformable conduit. The opposed arms may be formed from spring steel and be part of a coil spring pivoted at a spring mount. One end of the coil spring forms the moveable arm of the clamp. The other end of the coil spring extends from the coil and is retained against rotation in the collar such that on rotation of the moveable arm to a first position, energy is stored in the spring arm. A detent retains the spring arm in the first position. Each of the pair of opposed arms is biased such that each will, upon release, move across the passage through the collar. With a deformable conduit in place the respective arms will collapse the deformable conduit diametrically across the passage through the collar. It is preferred that the fire collar has opposed moveable arms such that the deformable conduit is collapsed substantially diametrically. It has been found that collapsing the deformable conduit utilising two opposed arms is quicker than using a single moveable arm against an anvil, as a single arm is required to travel across the entirety of the passage in order to completely collapse the deformable conduit, whereas each of two opposed arms only has to travel about half-way across the passage.

It will be appreciated that other biasing mechanisms my be used, including springs held in tension or compression in the first position such that a moveable arm of the clamp is urged towards the second position.

In a further embodiment the clamp may be formed from two opposing bars positioned on opposite sides of the conduit. The opposing bars may be biased towards a second position using pretensioned springs. The pretensioned springs may connect the opposing bars directly to one another or may be connected to the fire collar. Where the opposing bars are connected to one another using pretensioned springs it is preferred that the connection is recessed relative to that part of the bar which engages the conduit. In this way the pretensioned springs can collapse within the recess such that the bars completely collapse the conduit therebetween in the second position. Where the pretensioned springs are engaged with the collar, the pretensioned springs may pass freely through the opposed bar so as to assist in maintaining the position of the respective opposed bars.

In another embodiment of the present invention, the clamp may be in the form of a wire or cord drawn around the conduit. The cord may be biased using a pretensioned coil drum held in a pretensioned condition using the detent. On actuation of the detent, the coil drum draws the wire or cord so as to close or collapse the deformable conduit. For example, one end of the wire or cord may be attached to the collar and the wire or cord may pass one or more times around the conduit and then be attached to a coil drum whereby on activation of the coil drum the wire or cord tightens so as to close or collapse the conduit.

It has been found that when using a PVC conduit which deforms at the elevated temperatures occurring during a fire, the collapsed PVC conduit melds together to seal the conduit. This is of advantage in preventing the further transfer of smoke and gases through the conduit.

The clamp may be retained in the first position by at least one detent. The detent may be fusible or frangible. In one form, the detent may be formed from a material that has the dual properties of, firstly, being able to retain the clamp in the first position under normal conditions and, secondly, being able to yield when heated to a predetermined temperature of the type encountered when there is a fire on one side of the barrier in which the fire collar is located. These properties enable the detent to be designed as a heat detector and located in a manner that will retain the clamp in the first position but, when a predetermined temperature is reached, to yield, enabling the clamp to move to the second position and thereby to collapse the conduit.

Suitable heat detector materials from which the detent may be formed include lead and its alloys, plastics materials and various composites. Typically, the temperature at which such materials yield will be in the range of 60° C. to 120° C., depending upon the particular application, so as to meet governmental or local council requirements.

In yet another form of the invention, the detent can be operated by a thermocouple or other temperature or smoke sensor. The sensor can be connected by way of appropriate circuitry to a solenoid which can retract or release the detent to permit the clamp to close when the sensor detects a predetermined temperature value. Such a situation also permits the fire collar to be reset to the first position.

In one embodiment of the present invention, the deformable conduit may be encased in a sleeve of intumescent material. Encasing the deformable conduit in a sleeve of intumescent material advantageously accelerates the closing of the deformable conduit at elevated temperatures such as those encountered during a fire. The sleeve of intumescent material is preferably enclosed by an outer sleeve of a flexible yet inelastic material such as a glass cloth. Encasing the intumescent sleeve with an outer layer of glass cloth prevents the intumescent material expanding outwards, directing the expansion inwards, which forces the further collapse of the deformable conduit.

Embodiments of the present invention will now be described in detail, with reference to the accompanying drawings, in which.

Figure 1:
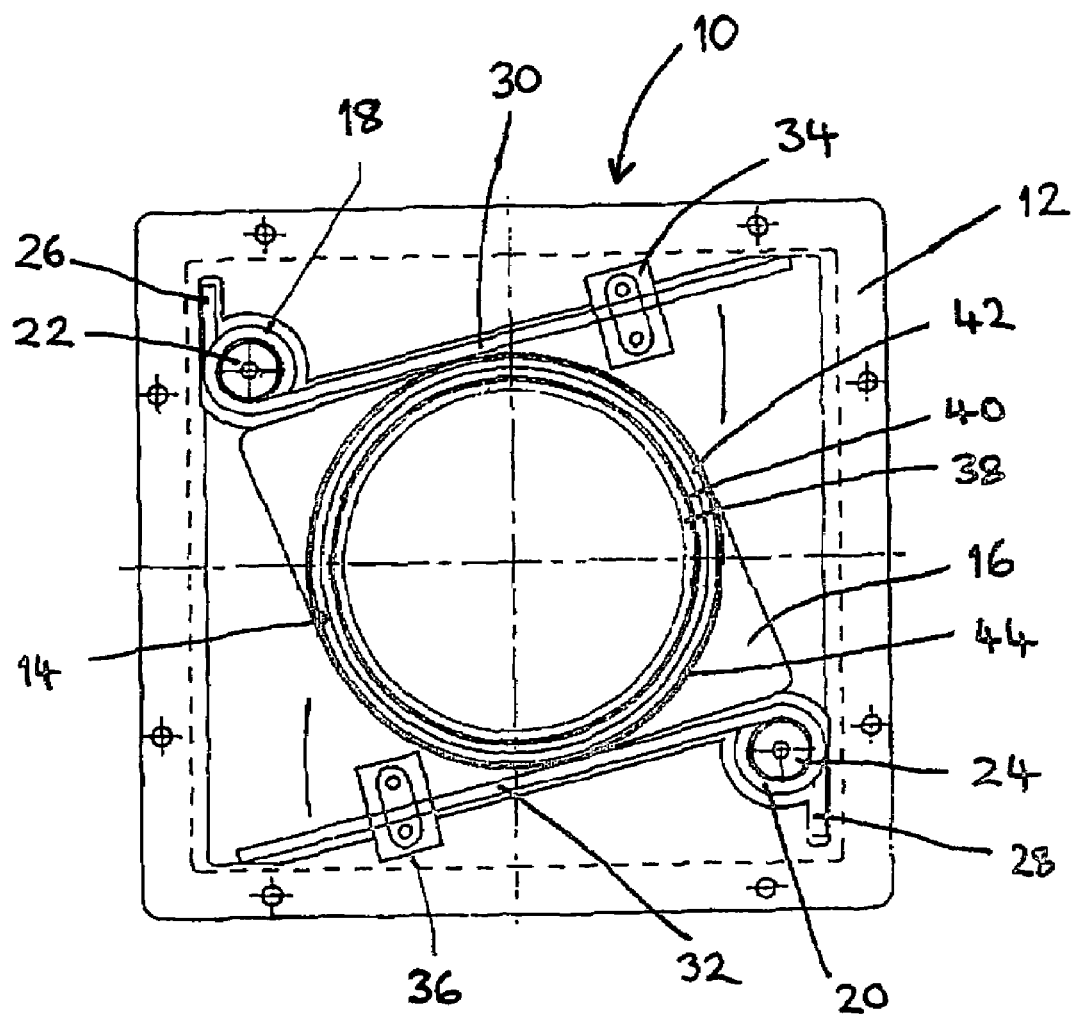
FIG. 1 is an underneath view of one embodiment of a fire collar according to the embodiment of the present invention.

FIG. 1 shows a fire collar 10 which is adapted to surround a pipe, conduit, duct or the like 14. The fire collar 10 includes a housing 12 which has a passage 16 extending therethrough, in which passage 16 a PVC conduit 14 is disposed.

Within the housing 12 there are also located two springs, 18, 20. The springs 18, 20 are substantially identical, and are located within housing 12 on opposite sides of the passage 16. Each spring 18, 20 is preferably a compression spring. Spring 18 is pivotally located on a spring mount 22, and spring 20 is pivotally located on a spring mount 24. One end 26 of spring 18 is permanently restrained by housing 12 against rotational movement about mount 22, and one end 28 of spring 20 is permanently restrained by housing 12 against rotational movement about mount 24.

The other end 30 of spring 18 is extended, forming an arm, and the other end 32 of spring 20 is also extended, forming an arm. Arm 30 is held in place against the force of spring 18, under a normal situation, by a detent 34, which may be a fusible link spring arm release, and arm 32 is held in place against the force of spring 20, under a normal situation, by a detent 36, which may be a fusible link spring arm release. The detents 34, 36 may take any form, so long as they operate at a predetermined temperature, releasing the arms 30, 32 to move under the respective forces of springs 18, 20 towards the second position in the direction of the arrows depicted in FIG. 1. One form of fusible link 34, 36 which may be preferred is a conventional cable tie, used normally to secure bundles of such things as reinforcing rods and the like. Cable ties are formed from a plastics material which will at least soften and possibly melt at the kind of temperatures found when a fire is present on one side of the slab 46, which would then allow arms 30, 32 to move under the force of springs 18, 20 to collapse. Under normal circumstances, cable ties would operate ideally to retain the arms 30, 32 in the first position, and would be applied in much the same way as occurs with the conventional use of such ties.

The passage 16 substantially follows the outer profile of the conduit 14, but is extended laterally so that it can accommodate deformation of the conduit 14 in the manner to be described hereinafter. The lateral extension of the passageway 16 minimises the resistance of the conduit to collapse.

The conduit 14 is formed by interlocking conduits 38, 40 respectively. An intumescent sleeve 42 may be disposed around the outer conduit 40. A glass cloth covering 44 may be disposed over the intumescent sleeve 42.

Figure 2:
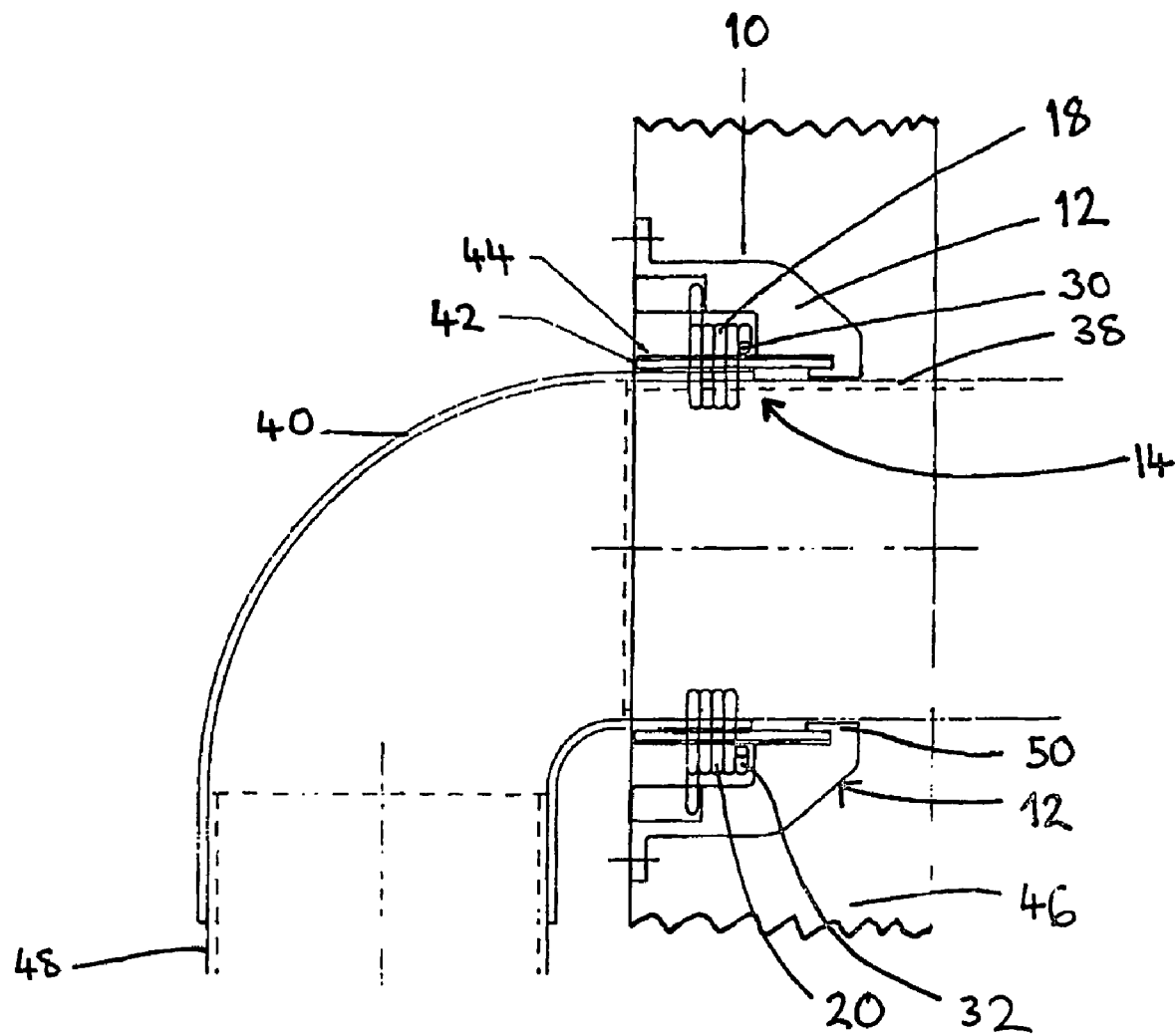
FIG. 2 is a cross-sectional view of the collar of FIG. 1, located in a concrete slab.

The fire collar 10 is intended to be located in a barrier such as a wall, floor, partition or the like. FIG. 2 shows the fire collar 10 of FIG. 1 in a 100 mm concrete slab 46. Conduit 14, within the fire collar 10, is formed from a horizontal pipe 38, located within one end of an elbow 40. A vertical pipe 48 is located in the other end of elbow 40. Pipes 38, 48 and elbow 40 are each preferably formed from PVC, or another material which makes at least pipe 38 and elbow 40 deformable. The housing 12 of fire collar 10 has an internal land 50 through which is received PVC conduit 38. PVC conduit 40 may be received within the collar 10 over the first PVC conduit 38. PVC conduit 40 may be closely received within the intumescent liner 42 and may extend into the collar housing 12 to the land 50.

The fire collar 10 operates as follows. Fire on one side of the fire collar 10 will pass through the PVC conduit 14. This will cause the conduit 14 to heat up and to soften. The intumescent liner 42 will swell and begin to collapse the PVC conduit 14. The fusible link spring releases 34, 36 will be activated once the temperature reaches a preset value. When the releases yield, spring arms 30, 32 will rotate under the forces of springs 18, 20 in the direction of the aforementioned arrows, to collapse the PVC conduit 14. Once the PVC conduit 14 has been collapsed, abutting internal surfaces will tend to meld to each other. The intumescent liner 42 will continue to expand, further closing the conduit 14. The collar 10 is also formed with an intumescent material further closing the conduit, and any opening in the barrier 46.

Figure 3:
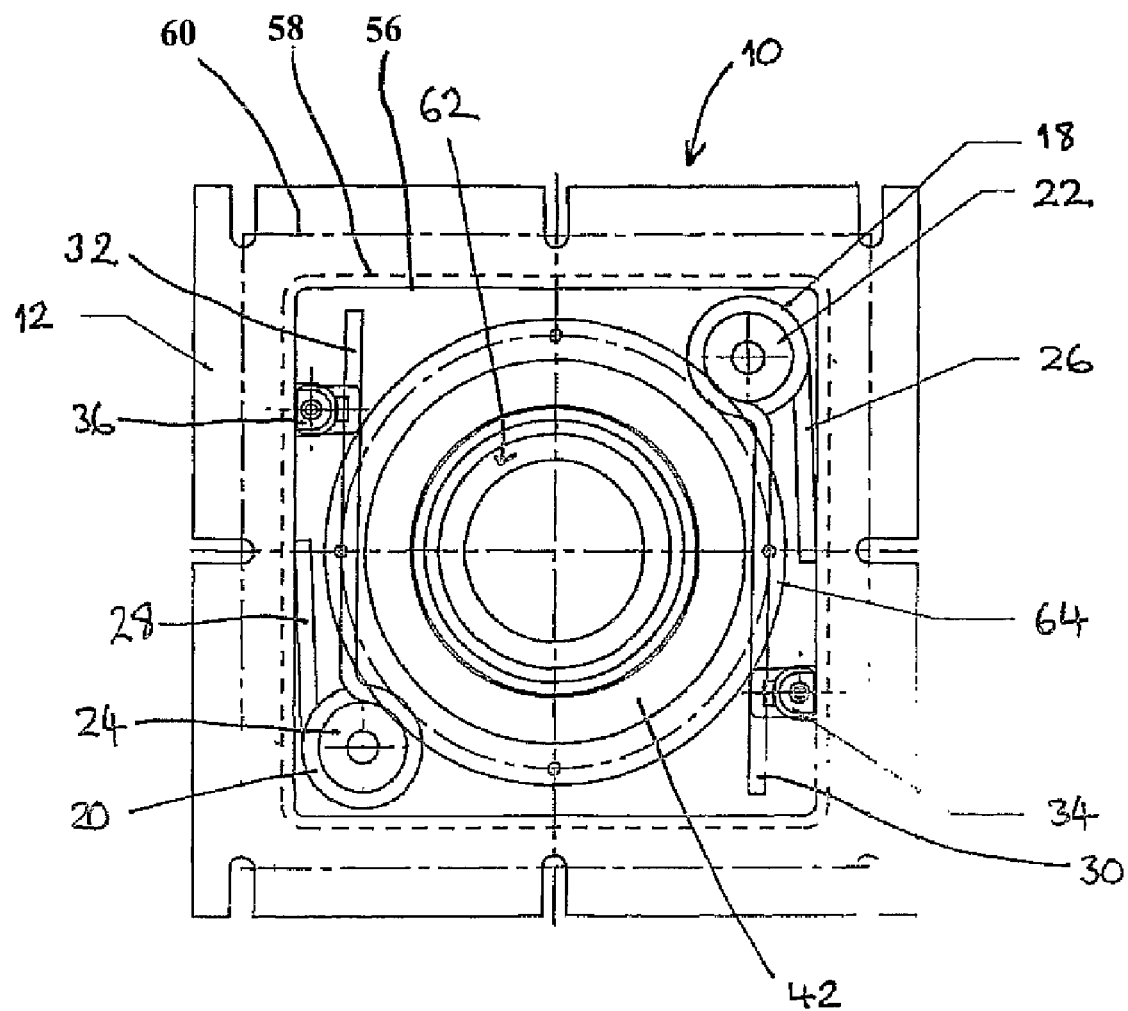
FIG. 3 is an underneath view of a fire collar according to another embodiment of the present invention.
Figure 4:
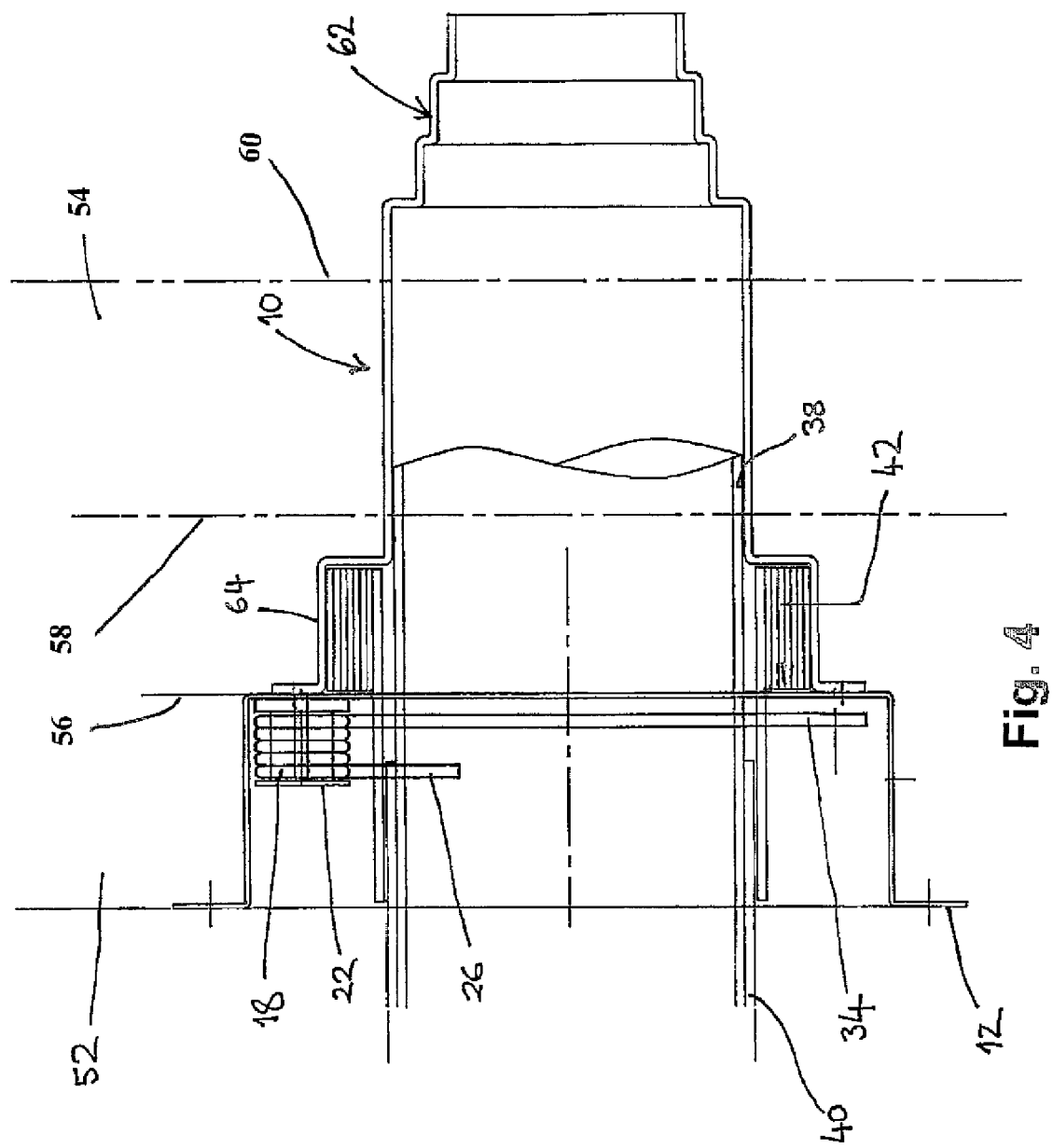
FIG. 4 is a cross-sectional view of the collar of FIG. 3, located in a concrete slab.

FIGS. 3 and 4 show an arrangement similar to that of FIG. 1. Reference numerals which are common to FIGS. 1, 3 and 4 denote the same features. It should be noted that the fire collar 10 of FIGS. 3 and 4 is shown located in alternative substantially vertical slabs 52, 54, which form walls or partitions rather than floors. However, the fire collar 10 of FIG. 3 and 4 may be used in any barrier.

The fire collar 10 may be seen as an "all-purpose" fire collar, which is able to be used with barriers such as wall slabs, of differing thicknesses. Slabs 52, 54 may have a common surface 56, with broken lines 58, 60 showing the other surfaces of respective slabs 52, 54, which may be, for example, 125 mm and 200 mm in thickness respectively.

One end 62 of the housing 12 may be stepped, to cater for connections to other conduits of differing diameters. For example, if conduit 38 has an internal diameter of 100 mm or 113 mm, the stepped end 62 may have sections of 92 mm, 83 mm and 71 mm in internal diameter.

Referring now in particular to FIG. 3, it can be seen that the arrangement of springs 18, 22 differs from that of FIGS. 1 and 2, in that arms 26, 30 and 28, 32 are in the open position in a substantially parallel position, substantially parallel to the vertical (as shown in FIG. 3) side of the damper 10.

A plate 64, preferably a metal plate, surrounds the intumescent material 42 such that expansion of the intumescent material 42 in a fire situation is inwards rather than outwards, and is thus contained within the fire collar 10 and assists, in a preferred situation, in collapsing the conduit 38.

The fire collar 10 of the present invention may be made of any suitable material. Metal and/or plastics material are suitable materials.

The invention claimed is:

1. A fire collar including:
    a mounting defining an opening having a center axis passing therethrough and being adapted to receive a deformable conduit therethrough having a longitudinal axis coaxial with said center axis;
    one or more torsion springs operatively connected to said mounting with the axis of the or each torsion spring being generally parallel to the center axis of said opening, and the or each torsion spring being loaded for movement of one tail from a non-operating mode proximal said opening to an operating mode in which at least a portion of said one tail extends at least partially across said opening in response to the ambient temperature reaching a predetermined level, said one tail being adapted to engage a deformable conduit passing through said opening and to force the deformable conduit to at least partially obstruct said opening.

2. A fire collar according to claim 1, wherein said torsion spring is centered on one side of said opening and the length of said one tail is selected such that in the operating mode, said one tail extends beyond the opposite side of said opening.

3. A fire collar according to claim 2, wherein said one or more torsion springs includes two opposed torsion springs centered on opposite sides of said opening, one being a left hand torsion spring and the other being a right hand torsion spring.

4. A fire collar according to claim 1, including retaining means adapted to retain each of said one or more torsion springs in the non-operating mode until said predetermined ambient temperature is reached.

5. A fire collar according to claim 4, wherein said retaining means includes a fusible link adapted to secure each said one tail to said mounting.

6. A fire collar according to claim 5, wherein said fusible link is formed from a plastics material which softens to a fusible state upon the ambient temperature reaching a predetermined "high" temperature at which it breaks.

7. A fire collar according to claim 1, including a layer of intumescent material secured to said mounting and adapted to at least partially form a sleeve about a conduit passing through said opening.

8. A fire collar according to claim 7, wherein said layer of intumescent material extends through said opening.

9. A fire collar according to claim 8, including a layer of protective material extending about said layer of intumescent material.

10. A fire collar according to claim 7, wherein said layer of intumescent material is a first layer and said mounting includes a housing which supports therein a second layer of intumescent material.

11. A fire collar according to claim 10, wherein said first layer of intumescent material is secured to said second layer of intumescent material and extends through said opening.

12. A fire collar according to claim 11, wherein said first layer of intumescent material is secured to said second layer of intumescent material and extends through said opening and a layer of protective material extends between the first layer of intumescent material and said second layer of intumescent material.

13. A fire collar according to claim 12, wherein the first and second layers of intumescent material are generally cylindrical in form and arranged to closely fit around the conduit which is to pass through said opening.

* * * * *